Sept. 20, 1971  L. N. KRAUSE ET AL  3,605,495

SENSING PROBE

Filed Sept. 29, 1969

INVENTORS
LLOYD N. KRAUSE
GEORGE E. GLAWE

BY

ATTORNEYS

United States Patent Office 3,605,495
Patented Sept. 20, 1971

3,605,495
SENSING PROBE
Lloyd N. Krause, Westlake, and George E. Glawe, Berea, Ohio, assignors to the United States of America as represented by the Administrator of the National Aeronautics and Space Administration
Filed Sept. 29, 1969, Ser. No. 861,649
Int. Cl. G01k 13/02
U.S. Cl. 73—198
9 Claims

ABSTRACT OF THE DISCLOSURE

A probe having a sensing head in the form of a blunted wedge with flat sides. An orifice is provided in each wedge face and communicates with a respective longitudinal passageway in the sensing head. A total pressure sensing tube extends from the blunted edge and communicates with another longitudinal passageway in the sensing head. A thermocouple is disposed in a tubular housing which extends from the blunted edge below and parallel to the pressure sensing tube. Bleed orifices are provided in the housing which is retained in a transverse passageway in the sensing head. A longitudinal groove is formed in the rear surface of the sensing head to contain a conduit for thermocouple leads which are directed to the thermocouple through a ceramic plug in the transverse passage. A cementitious material is used to fill the groove below the thermocouple conduit. The leads in the thermocouple conduit are surrounded by a ceramic material which has been swaged into the conduit.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to instruments measuring fluid flow pressure and temperature. It is directed more particularly to a sensing probe which may be inserted into a flowing fluid.

In order to study rotating machinery such as compressors and turbines, it is frequently necessary to provide apparatus for simultaneously measuring total temperature, total pressure, static pressure, and flow direction. The use of such an instrument shortens testing time by eliminating some of the probe surveys required when using instruments that measure only a single quantity. Furthermore, because of space limitations associated with many experiments it is desirable that the probe be able to pass through a small hole and have the sensing elements located near the axis of rotation of the probe shaft. In the past, probes have been provided for measuring fluid pressures and flow direction. In general, attempts to measure other parameters by incorporating additional instrumentation into such a probe have resulted in instruments which are excessively bulky and which cause excessive turbulence in the flowing fluid being studied.

OBJECTS OF THE INVENTION

In view of the foregoing, it is an object of the invention to provide an improved probe for measuring total temperature, total pressure, static pressure, and flow direction of a flowing fluid.

It is another object of the invention to provide a fluid sensing probe which minimizes turbulence in the flowing fluid whose parameters are being measured.

It is a further object of the invention to provide a minimum-sized fluid sensing probe which is relatively easy to fabricate.

Still another object of the invention is to provide a fluid sensing probe having sensing orifices located in respective faces of a blunted wedge-shaped sensing head, the orifices being located substantially on a longitudinal axis of rotation of the sensing probe.

Other objects and advantages of the invention will become apparent from the following description and drawings.

DESCRIPTION OF A PREFERRED EMBODIMENT OF THE INVENTION

Figure 1:
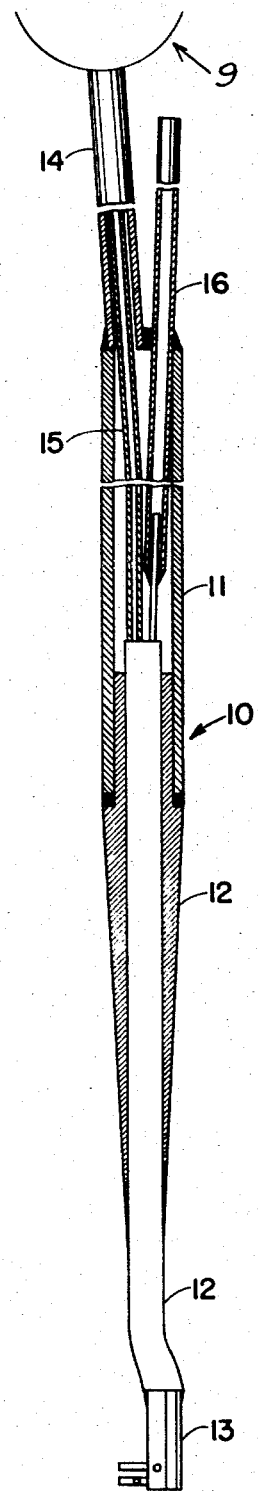
FIG. 1 is a partial longitudinal cross-sectional view of a structure embodying the invention.

Referring now to FIG. 1, there is shown a probe comprising a support tube 10, having a straight tube upper portion 11 and a tapered lower portion 12 whose outer diameter decreases in a direction toward a sensing head 13 which is attached to the lower end of the tube 12. The upper portion 11 of the tubular support 10 is connected to a suitable manipulative support 9. A conduit 15 in a tube 14 serves to encase leads connecting a thermocouple located in the sensing head 13 to an indicating instrument (not shown). In a like manner, a conduit 16 (one of three) serves to transmit pressure developed in the sensing head 13 to suitable pressure indicating instruments (not shown).

Figure 2:
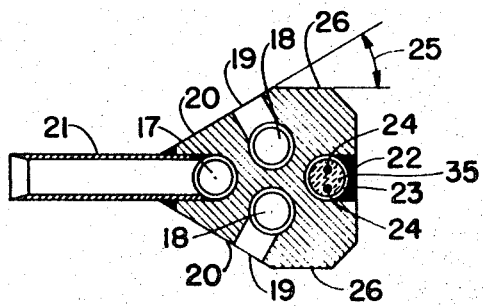
FIG. 2 is a transverse cross-section of the sensing head taken along the lines 2—2 of FIG. 3.

Referring now to FIG. 2, there is shown in transverse cross-section a longitudinally extending total pressure passageway 17 located just behind the blunted forward edge of the wedge-shaped sensing head 13 and in front of a pair of flow direction sensing passages 18. The passageways 18 communicate with respective orifices 19 positioned in respective wedge faces 20. A total pressure sensing tube 21 extends from the blunted front portion of the wedge and communicates with the passageway 17. A round bottomed groove 22 extends longitudinally along the rear surface of the sensing head to support a thermocouple conduit 23 which encloses thermocouple leads 24. A ceramic material 35 is swaged in the conduit 23. Each wedge face makes an angle 25 of 30° with the flat side surfaces 26 of the sensing head 13.

Figure 3:
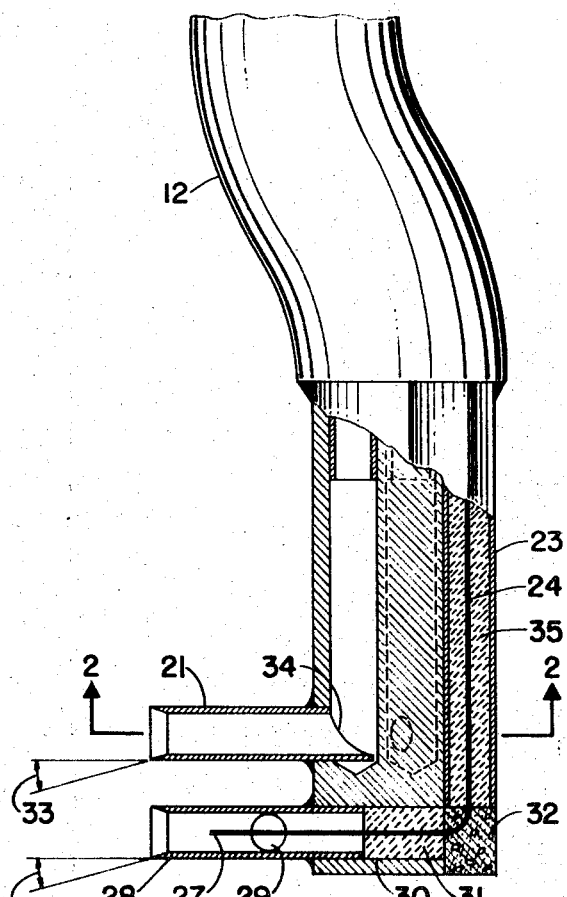
FIG. 3 is a longitudinal, cross-sectional view of the sensing head.

As shown in FIG. 3, the thermocouple leads 24 form a thermocouple junction 27 which is disposed in a tubular housing 28 having oppositely disposed bleed orifices 29 which may be longitudinally positioned about half way between the junction 27 and the blunted edge of the sensing head 13. The housing 28 extends into a transversely extending passageway 30 which is filled with a ceramic material plug 31 to support the thermocouple leads 24. Preferably, the junction 27 is about half way between the center of the bleed orifice 29 and the outer end of the housing 28. The lower end of the groove 22, as viewed in FIG. 3, is filled with a cement 32 capable of withstanding temperatures on the order of up to 500° C.

In order to minimize flow turbulence at the outer ends of the total pressure sensing tube 21 and the thermocouple housing 28 the interior surfaces at the outer ends of those tubes are chamfered at an angle 33 of about 15°. The inner end of the tube 21 is formed in a scoop shape as indicated at 34.

In operation, the sensing head 13 is positioned in a flowing fluid and the support 10 is rotated about its longitudinal axis until the pressure in the flow direction sensing passages 18 is equal. This indicates that the sensing tube 21 and the tubular thermocouple housing 28 are facing directly into the flowing fluid. The pressure transmitted through the tube 21 and the passage 17 to suitable indicating devices connected thereto will be the total fluid pressure present at the outer end of the tube 21.

Fluid will also flow into the thermocouple housing 28 passing over the thermocouple junction 27 and will exit from the thermocouple housing 28 through the bleed orifices 29. This arrangement causes the flowing fluid to maintain sufficient contact with the junction 27 to provide stable operation thereof.

It will be understood that changes and modifications may be made to the above-described fluid sensing probe without departing from the spirit and scope of the invention as set forth in the claims appended hereto.

What is claimed is:

1. A sensing probe adapted for insertion into a flowing fluid comprising:
    an elongated support;
    means for mounting one end of said support with said support extending into a flowing fluid;
    an elongated sensing head attached to the other end of said support, said sensing head in transverse cross-section having a blunted wedge shape, a plurality of longitudinal passageways in said sensing head, a longitudinal groove in the rear surface of said head, a transverse passageway in said head communicating with said groove, flow direction sensing orifices in respective wedge faces of said head communicating with respective ones of said longitudinal passageways;
    a pressure sensing tube extending from the blunt edge of said sensing means in communication with another of said longitudinal passageways;
    a tubular housing extending from the blunt edge of said head, one end of said housing being disposed in said transverse passageway, said housing having a bleed orifice therein;
    a thermocouple disposed in said housing;
    means for connecting said thermocouple to an indicating instrument via said groove and said support means;
    a ceramic plug disposed in said transverse passageway around said last named means which comprises connecting leads; and
    a cementitious mass disposed in said groove adjacent said transverse passageway.

2. The sensing probe of claim 1 wherein the inner end of said pressure sensing tube is scoop shaped.

3. The sensing probe of claim 1 wherein the included angle between the sensing head wedge faces is 60°.

4. The sensing probe of claim 1, said thermocouple housing having at least two oppositely disposed bleed orifices.

5. The sensing probe of claim 4 wherein said bleed orifices are equal in diameter to the interior diameter of said housing.

6. The sensing probe of claim 4 wherein said bleed orifices are longitudinally positioned about half way between said thermocouple and the blunt edge of said sensing head.

7. The sensing probe of claim 4 wherein said thermocouple is longitudinally positioned about half way between said orifices and the outer end of said thermocouple housing.

8. The sensing probe of claim 1 wherein a conduit is disposed in said longitudinal groove, said thermocouple leads being encased in ceramic material in said conduit.

9. The sensing probe of claim 1 wherein the outer ends of said pressure sensing tube and said thermocouple housing are chamfered at an angle of 15°.

References Cited

UNITED STATES PATENTS

| 2,512,278 | 6/1950 | Jones | 73—182X |
| 3,170,328 | 2/1965 | Werner et al. | 73—349 |
| 3,343,417 | 9/1967 | Peek | 73—345 |

FOREIGN PATENTS

| 571,118 | 2/1959 | Canada | 73—188 |

LOUIS R. PRINCE, Primary Examiner

FREDERICK SHOON, Assistant Examiner

U.S. Cl. X.R.

73—212, 344, 345, 349